July 30, 1957  C. J. SWARTWOUT ET AL  2,800,913
PNEUMATIC FORCE BALANCE RELAY
Filed Sept. 6, 1952  2 Sheets-Sheet 1

INVENTORS
CHARLES J. SWARTWOUT
EARL O. SCHWEITZER
BY Bosworth & Sessions

United States Patent Office 2,800,913
Patented July 30, 1957

2,800,913

PNEUMATIC FORCE BALANCE RELAY

Charles J. Swartwout, Chagrin Falls, and Earl O. Schweitzer, Wickliffe, Ohio, assignors to The Swartwout Company, Cleveland, Ohio, a corporation of Ohio Application September 6, 1952, Serial No. 308,826

1 Claim. (Cl. 137—84)

This invention relates to electronic control systems and more particularly to systems adapted for use in controlling industrial processes. Such systems are utilized for regulating an instrumentality or a plurality of instrumentalities in response to changes in one or more variables; for example, for controlling a valve or the like in response to variations in liquid level in a tank or in response to changes in temperature or pressure. The invention is described herein with particular relation to a system for controlling a valve in response to changes in a level in a tank in order to maintain the level at a set point, but it is to be understood that the system is of general application and that our invention is not limited to any particular field of use.

Industrial process control systems have been known and used for many years. Ordinarily, such systems have been entirely pneumatic; more recently, systems have been proposed that involve combinations of electric and pneumatic instrumentalities with mechanically moving parts such as slide wires and the like in the electrical portion. The arrangements usually are such that either time delays are encountered because of the pneumatic circuits, or sensitive and delicate electrical components must be placed immediately adjacent the apparatus being controlled and frequently in situations where ambient conditions are bad. Furthermore, most of the known electrical controls involve step by step rather than continuously variable response.

Accordingly, a general object of the present invention is to provide a control system that is primarily electrical, eliminates the difficulties of existing controls, provides superior response and regulation, is relatively sturdy and simple in construction and reliable in operation. Other objects of the invention are the provision of a control system in which there are no time delays in the transmission of a signal from one point to another so that the response is substantially instantaneous; the provision of a system in which mechanically moving parts and resulting friction and wear are eliminated except in the primary sensing element and the final controlling element, and in which, if desired, friction and wear can be eliminated at these points; the provision of a control system in which the response is continuous in all components, i. e., in which there are no mechanical or electrical devices that operate in a step by step manner; the provision of an electrical control system in which the response is continuous and which embodies adjustable proportional band, adjustable reset response and adjustable rate response or any of them; the provision of a control system that is electric up to the final instrumentality to be controlled, which may be operated by pneumatic, electric or other means; the provision of an improved means of modulating the air pressure in the pneumatic portion of a system embodying a pneumatic operator in proportion to the electric output of the control; the provision of a control system in which no delicate electric instrumentalities such as vacuum tubes are required either at the measuring element or at the final control element where ambient conditions may be poor; the provision of a control system in which the electric instrumentalities may be disposed at any convenient control point; the provision of a control system in which ordinary variations in line voltage and normal variations in vacuum tubes will not affect the accuracy and calibration of the system; the provision of a controlling system in which accurate control of the regulating valve means or the like in response to relatively small signals in the range of 0 to ½ volt is afforded; the provision of a control system in which reversal of response can be effected readily and in which desired fail-safe characteristics can be obtained with either direct or reverse response; the provision of an electrical control system in which the measuring or sensing element is a low impedance device, whereas the controlling system itself is a high impedance device, whereby the calibration of the sensing element remains steady and its output is not substantially affected by the operation of the control; the provision of a control system in which means are provided for effecting manual control of the controlled instrumentality and in which the control can be switched from manual to automatic control and vice versa without causing any substantial fluctuation in the value of the controlled variable; the provision of a control in which the automatic control elements can be disconnected or removed without disturbing the operation of the manual control; and the provision of a control system with a high degree of flexibility so that it can be adapted readily to various uses and purposes.

Referring now to the drawings.

The drawings are necessarily diagrammatic with respect to both electrical and mechanical components and no effort has been made to show the components in scale or in correct proportion to each other.

Figure 1:
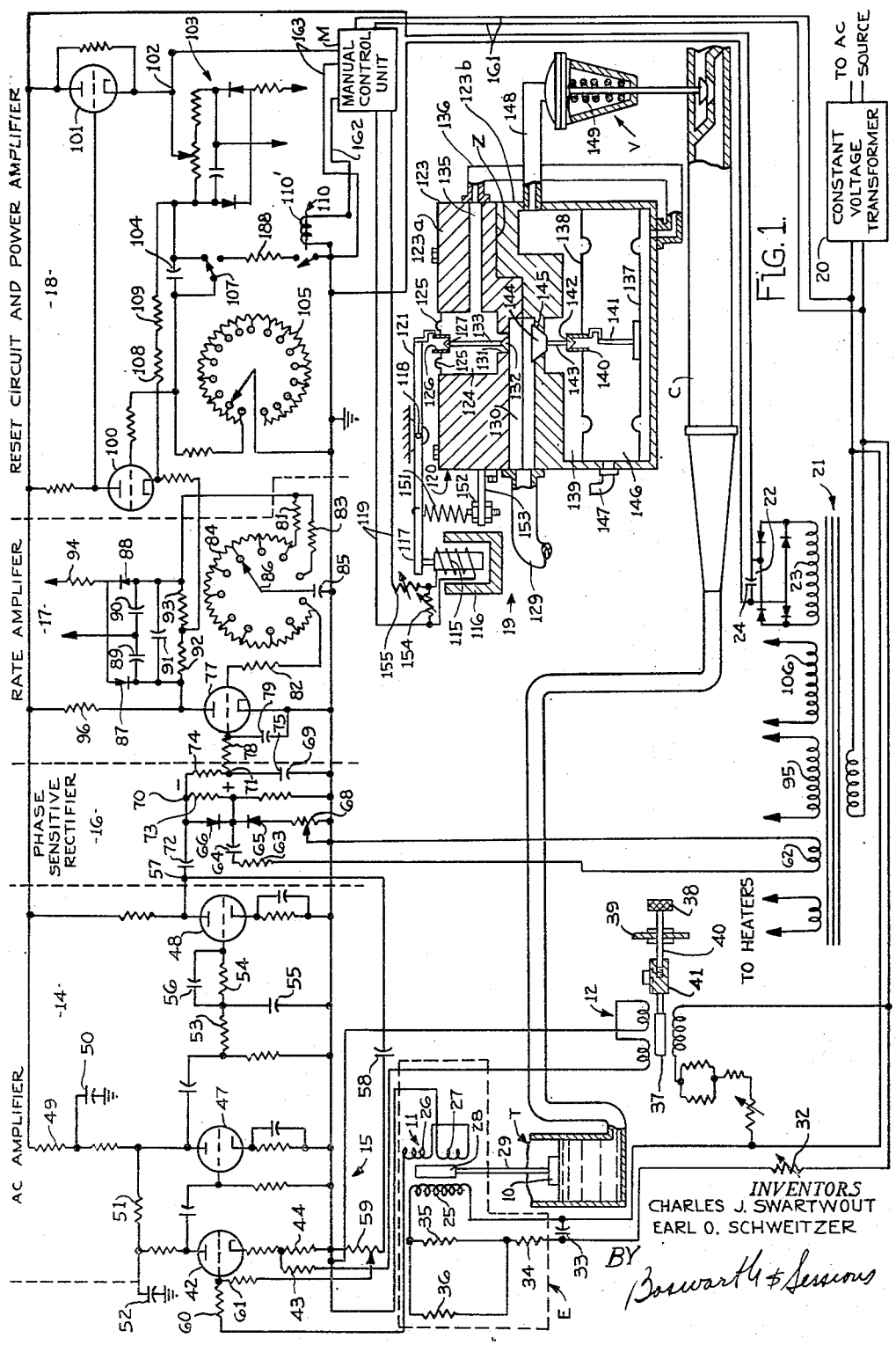
Figure 1 is a diagram of an automatic control system embodying our invention and showing the application of the system for the control of a valve in response to changes in the level in a tank.
Figure 2:
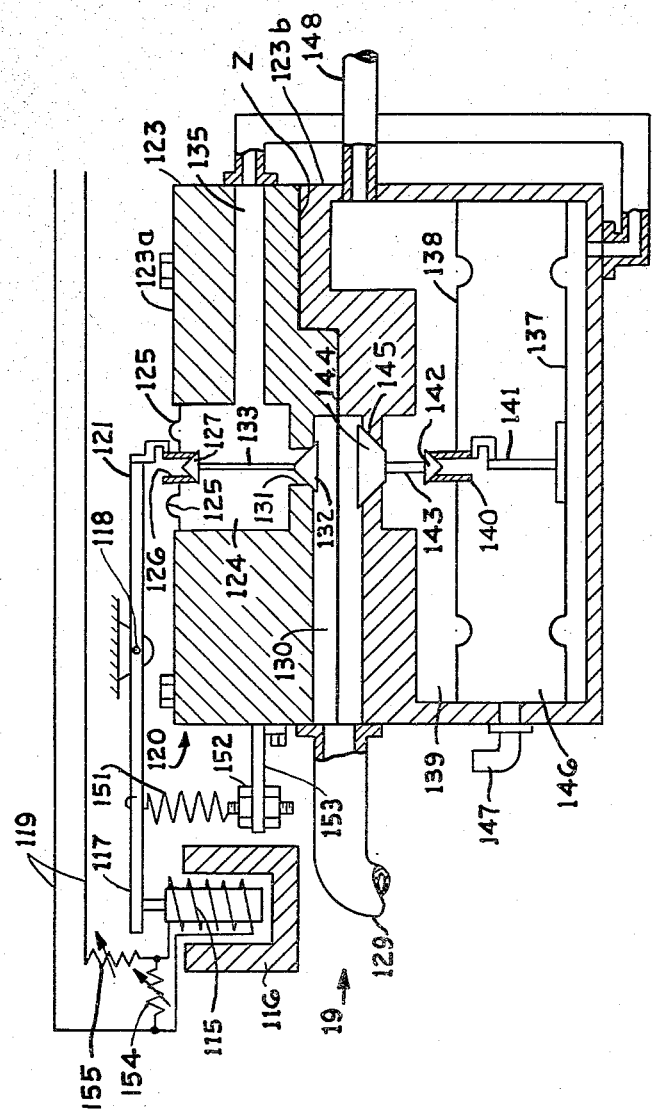
Figure 2 is an enlargement of the pneumatic relay portion of Figure 1 showing the details and arrangement of the valves therein.

*General arrangement.*—As indicated diagrammatically in Figure 1, the system is adapted, for example, to control the level of liquid in a tank T by adjusting a valve V in conduit C leading to the tank. The sensing element for determining the level of liquid in the tank and for initiating the control operation includes a float 10 which operates a differential transformer indicated in general at 11. The output of the differential transformer is compared with a set point voltage from an adjustable differential transformer 12 and the difference in the two voltages amplified by the alternating current amplifier indicated in general at 14. The alternating current amplifier embodies a proportional band control network indicated generally at 15 and described in detail below. The output of the amplifier is rectified by a phase sensitive rectifier indicated in general at 16.

In order to provide an adjustable rate response or derivative amplifier, the direct current output of the rectifier 16 is applied to the rate amplifier circuit indicated in general at 17. Adjustable reset amplification, or integration, and power amplification is obtained through the reset network and power amplifier indicated in general at 18. The output of the reset amplifier is utilized to control the electro-pneumatic power relay indicated in general at 19 wherein the electrical signals resulting from changes in the level of liquid in the tank T are converted into changes in air pressure so that the air pressure can be employed to operate the valve V to maintain the desired level in the tank. The manual control, indicated in general at M in Figure 1, may be interposed in the circuit between the reset amplifier and the power relay. Suitable switches in the manual control are utilized, as decribed below, to connect the manual control and disconnect the automatic control, and vice versa.

In practice it is preferred to construct the components of the automatic control as a compact single unit that can be replaced simply by unplugging one unit and plugging in a new unit in case of failure. This also gives flexibility to the control and makes it possible to interchange, if desired, units having different combinations of modifying controls; for example, a control unit omitting the reset amplifier might be substituted for a complete control. All control adjustments are accurately calibrated to facilitate such interchange of units. The manual control is also constructed as a separate unit, so that either the manual control unit or the automatic control unit can be removed without disturbing the other. The entire control, including the automatic control unit and the manual control unit, can be located at any convenient central location along with the set point voltage transformer 12. Only the differential transformer 11 and the electro-pneumatic power relay 19 are required to be placed near the tank T and valve V respectively; these elements can be of sturdy construction and able to withstand poor operation conditions.

*Power supply.*—Electric power for the automatic control is supplied by transformer 21, the primary of which is preferably connected to the output of a conventional constant voltage transformer 20 that is energized from an ordinary alternating current source; the secondaries of transformer 21 are used to supply the various voltages required by the circuit components. The B+ voltage is supplied by a full wave bridge rectifier indicated in general at 22, the rectifier being energized by secondary 23 and including a filter condenser 24.

*Input circuits.*—As noted above, the control operates upon the basis of a comparison between a voltage that varies with the variable to be controlled and an adjustable set point voltage. In the embodiment shown these voltages are derived from substantially identical differential transformers 11 and 12. It is to be understood that if it is desired to make the control responsive to more than one variable, a corresponding number of transformers 11, each actuated by an appropriate sensing element and with the outputs of the transformers combined, may be employed. Differential transformer 11 comprises a primary 25, secondaries 26 and 27 and a ferro-magnetic armature 28 that is connected by a suitable mechanical connection 29 with the float 10 in tank T. The primary 25 is energized by the constant voltage transformer 20. The secondaries 26 and 27 are connected to buck each other with the result that when the armature 28 is in mid-position equal voltages are induced in secondaries 26 and 27 and the output of the transformer 11 is zero. As the armature is displaced in either direction from the mid-position the voltages induced in the secondaries are unbalanced; the unbalance is substantially linearly proportional to the displacement of the armature so that the output voltage varies with the displacement of the armature. Displacement of the armature in one direction from the mid-position results in voltages that are 180° out of phase with voltages induced when the armature is displaced in the opposite direction from mid-position; however, the apparatus preferably is arranged so that within the normal operating range the displacements of the armature are on the same side of the zero or mid-position.

In order to make it possible to adjust the output voltage calibration of the differential transformer 11, the primary supply circuit includes a variable resistor 32 and a condenser 33 which prevents the phase of the output voltage from shifting when the output voltage is adjusted by means of resistor 32. The circuit of the primary 25 also includes conventional fixed calibrating resistors 34 and 35 and a negative temperature coefficient resistor 36 in shunt with resistor 35. These resistors provide a temperature compensated circuit that can be adjusted to make the output of transformer 11 substantially independent of changes in ambient temperature within reasonable ranges.

In the preferred assembly of differential transformer 11, the negative temperature coefficient resistor 36 along with calibrating resistors 35 and 34 are mounted immediately adjacent the windings 25, 26 and 27 of the transformer so as to be subject to the same ambient temperature changes. These windings and resistors 34, 35 and 36 preferably are mounted in a housing or enclosure made of suitable magnetic material and indicated in general by dotted lines at E in the drawings. The housing E acts as a magnetic shield for the transformer windings and in addition insures that the negative temperature coefficient resistor 36 and the windings will be subject to the same ambient temperatures thereby enhancing the accuracy of the transformer.

The set point voltage is derived from transformer 12 which is substantially identical with transformer 11, the primary of the transformer also being energized from constant voltage transformer 20 through calibrating and temperature compensating circuits identical with those described in connection with transformer 11. In transformer 12, however, the armature 37 is manually adjustable to give the desired output by means of knob 38 which is supported for rotation but held against longitudinal movement in a panel 39. The threaded end 40 of the shank of the knob engages within a threaded aperture in nut 41 which is restrained against rotation and is operatively connected to armature 37. Thus, rotation of the knob 38 results in longitudinal movement of the armature 37 and adjustment of the output voltage of the transformer 12. In practice, the control knob may be calibrated accurately in terms of the variable to be controlled; i. e., the liquid level in tank T in the present example. While the set point voltage is shown as being manually adjustable, it is contemplated that the adjustments may be made automatically, for example, according to a predetermined time schedule; or the set point voltage may be controlled in response to changes in one or more other variables, thus making the control responsive to a relationship between a plurality of variables.

The signal and set point voltage outputs of transformers 11 and 12, respectively, are of the same phase and the same order of magnitude, both voltages leading the power supply voltage by approximately 58° in a preferred embodiment of the apparatus. The signal and set point voltages constitute the input voltages of the control circuits and are compared by applying them to the grid and cathode, respectively, of a triode 42. Because the effect of a signal applied to the cathode of a tube is greater than the effect of a signal applied to the grid, resistors 43 and 44 are used to attenuate slightly the set point voltage before it is fed to the cathode of the tube 42; the attenuation is such that the input gains of the tube for signals of equal strength fed into the cathode and grid circuits are equal. Hence, tube 42 becomes a true differential amplifier that is sensitive only to the difference between the signal input voltage and the set point input voltage and is independent of the actual levels of these signals. This difference then becomes the control signal voltage that is amplified and modified by the control circuits and utilized to operate the power relay 19. The output of the differential amplifier tube 42 is either in phase with the signal and set point input voltages or 180° out of phase therewith, depending upon whether the signal voltage exceeds or is less than the set point voltage. The magnitude of the output voltage depends on the amount of difference between the signal and set point voltages.

*Alternating current amplifier and proportional band control.*—The A.-C. amplifier, indicated in general at 14, is essentially a conventional three stage, resistance-capacitance coupled feed back amplifier, the tubes 47 and 48 furnishing stages of amplification in addition to the amplification of tube 42. Resistor 49 and condenser 50 are utilized to reduce the amount of alternating current present in the voltages supplied to the plates of the amplifier tubes 42 and 47. Resistor 51 and condenser 52 provide decoupling between the first two amplifier stages. In order to eliminate high frequency components and oscillations in the amplifier, resistors 53 and 54 and condensers 55 and 56 are employed. Resistor 53 and condenser 55 also function to introduce a lagging phase shift in the signal voltage and thus compensate for the leading signal voltage output of the amplifier resulting from the 58° leading signal and set point inputs and bring the signal voltage into phase with the power supply.

To summarize, the signal input, which varies with the level of the liquid in the tank T, and the set point input are compared in the alternating current amplifier and the difference between the signal and set point inputs are amplified. If there is no difference between the signal input and the set point input then the control signal is zero and the output of the amplifier is also zero. Depending upon whether the signal input voltage is greater than or less than the set point input voltage the amplifier delivers an output voltage that is in phase with or 180° out of phase with the power supply, the amplified control signal voltage being proportional to the difference between the signal input voltage and the set point input voltage.

The action of the alternating current amplifier is modified by the proportional band control, which is, in effect, a sensitivity control that determines the amount of the response of the controlled element to given changes in the variable being controlled; i. e., in the present instance, the change in the position of the valve V in terms of percentage of its full travel that takes place in response to a given change in the level in the tank T in terms of percentage of the full scale movement of the differential transformer 11. This is defined as the percentage of the full range of the input signal that is required to produce full travel of the valve. At 100% proportional band the valve is moved through its entire range of movement in response to a change in the level of the tank equivalent to the full range of the level measuring element. At 5% proportional band only a 5% change in the level of the tank produces a full stroke of the valve. Thus low percentage of proportional band means high sensitivity, high percentage means low sensitivity. In the present system proportional band control is obtained through the network 15 which comprises a negative feed back circuit leading from the output of the alternating current amplifier at point 57 and to the input of the amplifier through condenser 58, adjustable resistor 59 and resistors 60 and 61. Resistor 59 is accurately calibrated so that its adjustment can be readily determined to facilitate interchange of controller when desired or necessary. Adjustment of the resistor 59 governs the amount of negative feed back and in a preferred embodiment of the system makes possible control of the proportional band from 3% to 200%. Also, the condenser 58 and resistor 59 constitute a phase shift network that advances the phase of the feed back signal approximately 58° to match the input voltages derived from transformers 11 and 12.

By this means adjustable proportional band control is introduced into the system simply and with a minimum of components. The use of negative feed back to accomplish this insures stable operation of the amplifier.

*Phase-sensitive rectifier.*—The phase-sensitive rectifier takes the alternating current control signal output of the alternating current amplifier 14 and converts it into a direct current control signal voltage that is proportional to the alternating current control signal voltage, the direct current voltage being positive when the alternating current output of the alternating current amplifier is in phase with the power supply and negative when this output is 180° out of phase with the power supply. Thus the phase-sensitive rectifier produces a direct current control signal voltage that is proportional to the difference between the input signal voltage and the set point voltage and hence is proportional to the level in the tank T as compared to the desired level.

This is accomplished preferably by the circuits shown in which a reference voltage derived from secondary 62 of the transformer 21 is supplied through resistor 63 and condenser 64 to the center point between rectifiers 65 and 66. Condenser 64, rectifier 65, resistors 68 and 69 constitute a shunt rectifier circuit which produces a direct current voltage of the polarity indicated between the point 71 and ground. By increasing the resistance of variable resistor 68, the effectiveness of rectifier 65 can be reduced which makes it possible to adjust the value of the voltage between point 71 and ground by means of variable resistor 68.

Condensers 72 and 64, rectifier 66 and resistor 73 also constitute a rectifier circuit. Assuming first that there is no output at the terminal 57 of the alternating current amplifier, then the reference voltage will produce a voltage between point 71 and across resistor 73 of the polarity indicated. Next, resistor 68 is adjusted to make the voltage across resistor 69 and the voltage across resistor 73 equal with no output from the alternating current amplifier, so that these voltages balance and there is no voltage between point 70 and ground. With the circuit so adjusted, the application of an input signal in phase with the reference voltage will reduce the effective alternating current applied to the rectifier circuit involving rectifier 66 causing the voltage across resistor 73 to be lower, while if the alternating current is out of phase with the reference voltage the voltage across resistor 73 will be increased. The amount of the reduction or increase depends upon the amplitude of the applied alternating current voltage. Inasmuch as the reference voltage is applied to both rectifier networks, the outputs of which are balanced against each other, while the signal voltage is applied to only one network, variations in the reference voltage amplitude within reasonably wide limits are ineffective to change the output whereas variations in signal voltage input result in substantially linear variations in output. The reference voltage must be greater than the maximum signal voltage, and in practice the reference voltage is normally three to four times the maximum signal voltage in amplitude. Resistor 74 and condenser 75 are added to the circuit to filter alternating current ripple from the output of the rectifier.

The response of the control can be reversed, that is, the output can be made to vary directly or inversely with the signal input voltage by merely reversing the connections to transformer secondary 62 and thus reversing the phase of the reference voltage supplied to the rectifier.

The rectifier produces a direct current control signal voltage that is proportional to the difference between the signal input voltage and the set point input voltage applied to the alternating current amplifier; this direct current voltage after amplification by the rate amplifier and the reset circuit and power amplifier is utilized to effect the automatic control of the valve V.

*Rate amplifier.*—The direct current control signal output of the phase-sensitive rectifier, which is proportional to the difference between the signal input and the set point input, is fed to the direct current rate amplifier indicated in general at 17. Essentially this comprises a direct current amplifier with a gain of, for example, about 50 and with a negative feed back circuit arranged with a time delay network. The feed back reduces the normally high amplification of the amplifier to substantially unity for the steady state; the time delay network reduces feed back for rapid changes. When no rate action is employed, the output of the amplifier is substantially equal to the input regardless of rate of change. When rate action is employed, a sudden change in control voltage input to the rate amplifier results in high amplification initially because there is the feed back delay. However, after a time interval determined by the adjustment of a resistor-capacitor network, the feed back again makes the output substantially equal to the input. The direct current output of the rate amplifier thus is not only proportional to the deviation between the input signal voltage and the set point voltage but also to the rate of change of the input signal with respect to the set point voltage. Hence, the effect of the rate amplifier is to make the controller sensitive to rapid changes in liquid level in tank T and provide corrective control in proportion to the rate of change of level.

Preferably, these results are accomplished by feeding the output of the phase-sensitive rectifier to the grid of tube 77 through resistor 78, capacitor 79 being employed to filter out high frequency components. The negative feed back circuit includes fixed resistors 81 and 82, variable resistor 84 and condenser 85. In order to give the required time delay and accuracy, condenser 85 should be a high quality, low leakage condenser of substantial capacity, for example, in one embodiment a six microfarad condenser has been employed at this point. Resistor 84 preferably is a step-type resistor as shown and is accurately calibrated to permit convenient interchange of control units as described heretofore.

With this arrangement condenser 85 together with resistor 81 and that portion of the variable resistor 84 between resistor 81 and the adjustable contact 86, constitute a time delay network in the feed back circuit, the condenser shunting out the high frequency components and reducing the negative feed back to the grid for comparatively rapid changes in input to tube 77. It will be noted that adjustment of the resistor 84 does not change the total resistance in the grid circuit in any way but simply changes the amount of resistance that is in series with condenser 85. Thus for steady state conditions the feed back is the same regardless of the point of adjustment of the resistor 84.

When it is desired to eliminate completely the rate effect, the adjustable contact 86 is moved out of contact with resistor 84 and to a position where the condenser 85 is in series with resistor 83 and disconnected from resistor 84. This circuit simply places a charge on condenser 85 so that when the rate action is turned on again there will be no undesired fluctuations of the control.

In order to lower the plate voltage to a value suitable for feeding back to the grid of the tube, a floating power supply unit comprising rectifiers 87 and 88, capacitors 89, 90 and 91 and resistors 92, 93 and 94 is interposed in the feed back circuit. This unit receives its power from secondary 95 of the power transformer 21 and constitutes a more or less conventional voltage doubler circuit. The values of grid resistors 78 and 83 are very high compared to the value of plate resistor 96 with the result that there is no appreciable current flow in the grid circuit and through the floating power supply.

The rate amplifier can be adjusted from a condition in which the rate action is completely eliminated to a condition in which a signal impressed on the system as a result of a sudden change may be greatly amplified to give prompt and effective response to a quick change and normal response to slower changes in input.

*Reset circuit and power amplifier.*—The reset circuit and power amplifier gives an output proportional to the input and the time integral of the input. By means of this part of the controller, a very small input signal, if it persists for a sufficient period of time, can be made to give the maximum output signal that is obtainable with the system. This action enables the controller to compensate for wide changes in load conditions without sustained deviations of the controlled variable from the set point.

In the embodiment shown, the power amplifier includes a voltage amplifier tube 100 that furnishes amplified voltages in proportion to the deviation of the input voltage from the set point voltage and a cathode-follower power amplifier tube 101. A signal impressed on the cathode of tube 100 is amplified thereby and appears at point 102, the output of the follower tube 101. By combining a negative feed back circuit with a positive feed back circuit, the overall gain of these amplifiers is caused to be very small, practically unity, for rapid changes of signal input, while the gain is caused to become very large, of the order of 200 or more to 1 for steady or very slow changing signal inputs. The negative feed back circuit connects to point 102, which is the output terminal of the reset circuit and the entire controller unit, continues through the floating power supply indicated in general at 103, and connects to the grid of tube 100 through a variable resistor-capacitance network comprising condenser 104 and variable resistor 105. The latter network provides an adjustable time constant in the negative feed back circuit through variation of the effective resistance of accurately calibrated variable resistor 105 and hence provides the adjustable reset function. The floating power supply 103 is in all essential respects similar to the floating power supply used in the rate amplifier and is energized from the secondary 106 of the power transformer 21. It is inserted into the circuit for dropping the output voltage down to a value suitable for feeding into the grid of tube 100. Switch 107 when in the position shown shorts out condenser 104, provides direct current negative feed back to tube 100 and reduces the gain to unity and thus eliminates the function of the reset network. With switch 107 open, direct current feed back is blocked by condenser 104 and negative feed back occurs only for rapidly changing signals.

The positive feed back circuit also connects to point 102 on the cathode of follower tube 101, passes through power supply 103, and then connects to the cathode of tube 100 through positive feed back resistors 108, 109. This is regenerative feed back and has the effect of greatly increasing the gain of the amplifier for even very small input signals; hence the gain of the amplifier in effect approaches infinity for steady-state direct current input, which is a desirable condition for a reset circuit.

With this arrangement of positive and negative feed back circuits and a time delay network in the latter circuit, the amplifier has a very high gain for direct current or slowly changing input signals because direct current negative feed back is blocked by condenser 104, and the amplifier reacts solely to positive feed back. However, when the input signals change rapidly in value and have high frequencies, the gain of the amplifier approaches unity by reason of negative feed back. By adjusting the value of resistor 105 from minimum to maximum, the reset rate in a preferred embodiment is adjustable from a maximum of 20 repeats per minute to a minimum of .03 repeats per minute.

The switch 107 is used to shunt out condenser 104 when it is desired to eliminate reset action. Relay 110 when energized shunts resistor 105 when reset switch 107 is closed and is utilized, as appears more fully below, to provide fast reset action when the manual control unit is in the manual-balance position with the result that there is no substantial fluctuation in the controlled variable when the control is switched from manual to automatic operation.

With this arrangement the power amplifier provides the power required for operating the controlled instrumentality such as the power relay 19 and the reset action gives full travel to the valve V in a predetermined period of time regardless of how small the deviation of the input voltage from the set point voltage may be.

While the alternating current amplifier 14, rate amplifier 17 and power amplifier of the reset circuit 18 are described above as having a total of six vacuum tubes, it will be understood the elements of these tubes may be combined in pairs in the same glass envelopes so that the physical number of the tubes in the controller may be reduced to three, that is, three duo-triodes.

*Electro-pneumatic relay.*—As stated above the output of the automatic control unit is a direct current voltage having a magnitude that is a function of the deviation or error in liquid level in tank T as measured by the float 10. This direct current output is used to control the action of valve V in a manner to correct the deviation or error. In order to convert the electrical energy of the output of the control unit into a force capable of accurately positioning the valve V, the electro-pneumatic power relay 19 illustrated schematically in Figure 1 is provided.

The electrical components of the relay 19 comprise a moving coil 115 disposed in the field of a permanent magnet 116 and mechanically connected to a lever arm 117 adapted to pivot about fulcrum 118. Fulcrum 118 preferably is a spring pivot to eliminate friction and backlash. When the relay 19 is automatically controlled by the automatic control unit described above, coil 115 is energized by the output of the automatic control unit and is connected thereto by means of leads 119, the manual control unit M and leads 163. The force which coil 115 exerts on lever arm 117 as determined by the output control voltage of the control system is normally balanced by a force exerted by the pneumatic pilot valve assembly indicated in general at 120. When a change in the output of the controller occurs, the force exerted by coil 115 on lever 117 increases or decreases thereby momentarily upsetting the balance of forces acting on opposite ends of the lever. As a result of this unbalance, the lever 117 pivots slightly about fulcrum 118 thereby causing the end 121 of the lever to move up or down which initiates a change in air pressure in the assembly and restores the balance of forces. Variations in voltage result in changes in or unbalancing of the forces exerted by the pilot diaphragm 125 and coil 115.

The pilot valve assembly 120 controls the supply of fluid, that is, air, under pressure to a conventional pneumatically operated diaphragm actuated regulating valve V in accordance with movement of lever arm 117 and comprises a split housing 123, the upper part 123a having an upper chamber closed at the top by a diaphragm 125. A hollow sleeve 126 is secured to and movable with diaphragm 125 and is also connected to and movable with the end 121 of the lever arm 117. The lower end of sleeve 126 constitutes a valve seat which is normally engaged and closed by valve head 127.

Air under pressure is carried by conduit 129 to chamber 130 within the housing 123. Communication between chambers 130 and 124 is made through port 131 which is normally closed by valve head 132 connected by valve stem 133 to the upper valve head 127. Downward movement of diaphragm 125 causes valve head 127, stem 133 and valve head 132 to move downwardly correspondingly. The pressure of air in the chamber 130 acting against the bottom of valve head 132 urges both valves 132 and 127 upwardly to a normally closed position.

Upper chamber 124 of the housing 123 communicates via passageway 135 and conduit 136 to the underside of flexible diaphragm 137 secured to and located in the lower part 123b of the housing 123. Thus, the unit pressure on the undersides of diaphragms 137 and 125 are substantially equal. The effective area of diaphragm 137 preferably is substantially greater than the area of diaphragm 125 and hence the force exerted on the former is proportionately greater than that exerted on the latter for a given pressure on the diaphragms. Another flexible diaphragm 138 is secured to the lower part of the housing in vertically spaced relation to diaphragm 137 and defines the bottom of another pressure chamber 139 in the housing.

The diaphragm 138 has a hollow sleeve 140 which has a larger diameter than sleeve 126 on diaphragm 125 and which is connected by member 141 to and is movable with lower diaphragm 137. Valve head 142 seats on the top of and normally closes sleeve 140 and is connected by stem 143 to valve head 144 which seats on and normally closes port 145 between chamber 139 and supply air chamber 130. The area of the opening of port 145 preferably is substantially greater than the area of the opening of port 131 and hence the air handling capacity of the former is correspondingly greater than that of the latter. The space 146 between diaphragms 137 and 138 is connected to atmosphere by conduit 147. Chamber 139 is connected by conduit 148 to a conventional diaphragm actuated regulating valve V, the pressure of air against the diaphragm being balanced by a spring 149 that in the embodiment shown in the drawing always tends to open the valve V.

The housing 123 preferably is constructed in two parts or sections secured together along the parting line Z at about the central section of the housing. This construction permits convenient access to the valves 132 and 144 for inspection, cleaning and/or replacement when desired or necessary.

The operation of the electro-pneumatic relay is as follows: Assume that the output of the automatic control unit, for example, calls for a decrease in supply of liquid to the tank T. The output current from the automatic control unit for such a condition causes relay coil 115 to move upwardly as viewed which in turn causes lever 117 to pivot clockwise about its fulcrum 118 and the opposite end 121 of the lever to move downwardly. This movement of lever arm 117 presses diaphragm 125 downwardly and causes valve head 132 to open admitting air under pressure to chamber 124 until the pressure in chamber 124 builds up sufficiently to cause diaphragm 125 to exert an equalizing force against lever arm 117 at which time a state of equilibrium is reached with the force exerted by the diaphragm 125 balancing the force exerted by coil 115 and valve head 132 closes port 131.

The air pressure in upper chamber 124 is communicated to the underside of diaphragm 137 by passageway 135 and conduit 136 so that diaphragm 137 moves upwardly in response to the increase in pressure. This motion of diaphragm 137 is transmitted by member 141 to diaphragm 138, stem 143 and valve head 144, the latter thereby opening sufficiently to admit supply air under pressure through port 145 to chamber 139. When the air pressure in chamber 139 reaches a value such that the force on diaphragm 138 will be equal and opposite to force on diaphragm 137, a state of equilibrium is reached and valve head 144 closes. The increase in air pressure in chamber 139 is transmitted by conduit 148 to the diaphragm of valve V which causes the valve to close and reduce the flow of water to the tank.

When the opposite condition is sensed by the primary measuring element, that is, when the water level in the tank decreases, the direct current output of the automatic control unit is reduced, the coil 115 exerts less force than the force exerted by diaphragm 125 and a condition of unbalance exists whereby lever 117 pivots in a counterclockwise direction about fulcrum 118 and the end 121 of lever 117, diaphragm 125 and sleeve 121 move upwardly. This movement of sleeve 126 unseats valve head 127 from the bottom of the sleeve and permits the air under pressure in chamber 124 to exhaust through the sleeve to atmosphere, decreasing the pressure in chamber 124 and on the underside of diaphragm 137 which unbalances the opposed forces exerted by the diaphragms 137 and 138.

That is to say, diaphragm 137 will exert a lesser force by reason of the pressure decrease than the force exerted by diaphragm 138. As a result, these diaphragms move downwardly, the downward movement of diaphragm 138 causing unseating of valve head 142 from sleeve 140 and permitting chamber 139 to exhaust to atmosphere through conduit 147. This exhausting of chamber 139 reduces the pressure of air therein which in turn reduces the pressure acting on the diaphragm of valve V and permits valve spring 149 to open the valve a greater amount and increase the flow of water to the tank T.

The action of the electro-pneumatic relay 19 may be made to correspond either directly or inversely to the output of the automatic controller by reversing the connection of the leads to the moving coil 115. That is, with the leads connected to the coil 115 for direct action of the relay, air pressure to the regulating valve V increases or decreases directly as the controller output increases or decreases, and with the leads connected for reverse action, the air pressure increases with a voltage decrease and decreases with a voltage increase from the controller. Provision of direct-reverse action in the power relay together with the direct-reverse action obtainable through connection of the reference voltage leads to the phase-sensitive rectifier, permits the whole control system to be made fail-safe regardless of the type of regulating valve employed.

Zero adjustment of the relay 19, that is, adjustment of the control air pressure in the pilot valve assembly to a desired value for a given output of the controller, preferably is accomplished by means of spring 151 attached at one end to lever 117 as shown and whose tension or compression is adjustable by means of a nut and bolt assembly 152 which secures the other end of the spring to an anchor 153. The effect of spring 151 is to increase or decrease the force exerted by the coil 151 on the lever. The total force exerted by the coil and spring is adjustable by means of the nut and bolt assembly 152 and hence the control pressure in pilot valve assembly 120 and consequently the degree of opening of valve V is adjustable to a desired value for a given output voltage of the controller.

Adjustment of the range or span of opening of the valve V for a given range of output of the controller is accomplished by means of variable resistor 154 which shunts across relay coil 115 and permits manual variation of the percentage of control output current passing through the coil. For example, assume the range of variation of output current of the controller is 4 milliamperes and for such a variation of current passing through coil 115 the range of opening of valve V is maximum or 100% of its full travel. With resistor 154 adjusted so that half the controller output current passes through the coil 115, that is, the variation of current flowing through coil 115 is 2 milliamperes, the range of opening of valve V is reduced to 50%, for the full range of controller output. An additional variable resistor 155 is connected in series with coil 115 and resistor 154 in order to maintain a constant resistance load on the controller regardless of the setting of shunt resistor 154 and thus to maintain the impedance of the circuit at the desired level.

The relay 19 is a force balance mechanism, that is, a force proportional to the output voltage of the automatic control unit is balanced against an air pressure so that the air pressure supplied to the regulating valve V bears a proportional linear relationship to the output voltage from the control unit. The two stage diaphragm arrangement of the relay has the advantage of increasing the air handling capacity of the device without decreasing its sensitivity to relatively small signals from the automatic control unit. That is to say, the area of diaphragm 125 should be relatively small so that the balancing forces which the diaphragm exerts will be substantially in the same order of magnitude as the forces exerted by relay coil 115. Valves 127 and 132 preferably are relatively small in size so that the forces which these valves exert on lever arm 117 are negligible compared to the forces exerted by diaphragm 125. However, the correspondingly small openings in sleeve 126 and port 131 on which valves 127 and 132, respectively, seat, are capable of controlling or handling only small quantities of air. In order that the power relay will be capable of quickly actuating, for example, a relatively large regulating valve V, a second or booster stage is provided in the relay, which booster stage includes a supply port 145 and an exhaust sleeve 140, each having relatively large openings compared to port 131 and sleeve 126 and thus having substantially larger air handling capacities for properly actuating valve V. The capacity of the pilot valve assembly 120 may also be increased by providing a diaphragm 138 having an effective area smaller than that of diaphragm 137 so that a correspondingly greater control pressure in chamber 139 is required to effect a balance of forces exerted by diaphragms 137 and 138. In addition, the pilot valve assembly is completely enclosed thereby protecting the working parts from dirt and other foreign matter and insuring trouble free service.

*Summary of operation.*—In placing the apparatus in condition for automatic operation, the connections to transformer secondary 62 and coil 115 are arranged so as to give the desired result in the controlled instrumentality for a change in the variable being controlled. In the present example these connections are arranged so that as the level of liquid in tank T falls the pressure of the air supplied to valve V is reduced thus permitting spring 148 to open the valve and supply more liquid to the tank to bring the level back to the set point. The opposite action takes place when the level rises.

Other preliminary adjustments include the adjustment of the tension of spring 151 to set the zero position of valve V, and the adjustment of resistor 154 to adjust the range of movement of valve V for a given change in the current flowing through the coil 115 of the power relay. Also, the set point transformer 12 may be calibrated in terms of the level of liquid in the tank T.

When power is supplied to the system it is only necessary to adjust the set point transformer 12 to the desired value and the control automatically operates the valve V to maintain the level in the tank T as near to the set point as possible. The level in the tank T is measured by the differential transformer 11. The outputs of differential transformers 11 and 12 are compared in tube 42 and the difference, if any, amplified by the alternating current amplifier made up of tubes 42, 47 and 48. Proportional band control is provided by the adjustable resistor 59 which controls the negative feed back to the grid of tube 42. The width of proportional band selected depends upon the nature of the variable being controlled, for example, if the level in the tank T fluctuates only slowly a wide proportional band giving relatively slow response and great stability may be employed. If the changes in the level in the tank are more rapid, the resistor 59 may be adjusted to give a narrower proportional band so that a given change in level in tank T will produce a greater change in the opening of valve V.

The output signal of the alternating current amplifier, which is a function of the difference between the signal and set point input voltages as modified by the proportional band control, is rectified by the phase-sensitive rectifier. Inasmuch as the rectifier involves the comparison of the output signal with a reference voltage derived from the same alternating current source, that is, the power supply for the entire system, changes in the voltage of the power supply within reasonable limits do not affect the output of the rectifier. The direct current signal output of the phase-sensitive rectifier is applied to the rate amplifier which embodies an adjustable negative feed back control that makes it possible to obtain a large amplification of the signal for rapid changes while there is substantially no amplification for steady-state or slowly changing signals. This gives stability of operation when that is required and rapid response when changes in the level of the tank T demand rapid changes in the valve V in order to prevent wide departure of the level in the tank from the set point.

The signal voltage, as modified by the rate amplifier, is next supplied to the power amplifier and reset network. In this section of the control, the amplification is through a voltage amplifier 100 and the cathode follower 101 with positive and negative feed back from the cathode follower to the voltage amplifier. Condenser 104 in the negative feed back circuit eliminates direct current negative feed back while adjustable resistor 105 leading to ground provides, with condenser 104, an adjustable time constant in the negative feed back. These circuits give adjustable reset action or integration to the control so that the valve V can be moved to the limit of its travel in a predetermined period of time regardless of how small the signal input to the cathode of the voltage amplifier tube 100 may be. This makes it possible for the valve V to compensate for wide variations in the amounts of fluid required to maintain the level in tank T without requiring any substantial difference between the level in the tank and the set point. The negative feed back circuit provides stability of operation under changing conditions and makes the reset circuit responsive only to steady-state or slowly changing conditions.

The output of the power amplifier is supplied to the power relay or transducer 19 which accurately controls the pressure of air supplied to valve V in response to changes in the flow of current through the moving coil 115.

From the foregoing description it will be evident that the invention provides a continuously variable electrical control system whereby one or more variables may be utilized to control one or more instrumentalities. The control acts substantially instantaneously inasmuch as it does not require long pneumatic lines. All delicate components of the system can be placed in a central location away from the severe operating conditions frequently encountered where such control systems are needed. The control is compact and flexible and can be adapted to many uses and purposes inasmuch as it involves all of the factors required for rapid and accurate response and at the same time stable and reliable operation. The control involves no moving parts except at the sensing element and the power relay; hence there are no problems of friction, backlash and wear. The components may be standard electrical components of known reliability. Only three double triode tubes are required to carry out all of the control functions and other components are kept at a minimum so that the apparatus is compact and can be constructed at reasonable cost.

Those skilled in the art will appreciate that various changes and modifications can be made in the preferred form of control system described in detail herein by way of example without departing from the spirit and teachings of the invention. The scope of the invention is defined in the appended claim.

We claim:

In a system of the type described having a control unit, a power relay comprising means for exerting a force proportional to the output of said control unit, a pilot valve assembly adapted to balance said force and to transmit a control pressure proportional to said balancing force, said assembly comprising a split housing having two parts detachably connected together, a first pressure chamber in one housing part, a control pressure chamber in the other housing part, a supply pressure chamber adjacent said first and control pressure chambers, and means for maintaining a pressure in said first and control chambers proportional to the force exerted by said first named means comprising two ports connecting said supply chamber to said first pressure chamber and said control pressure chamber, respectively, valves associated with said ports for controlling the flow of fluid therethrough in response to variations in the force exerted by said first named means, said ports and said valves being located adjacent the parting line between said two parts of said housing whereby upon separation of said two housing parts to be accessible for inspection and maintenance.

References Cited in the file of this patent

UNITED STATES PATENTS

| | | |
|---|---|---|
| 2,219,062 | Almond et al. | Oct. 22, 1940 |
| 2,285,540 | Stein et al. | June 9, 1942 |
| 2,310,298 | Kuhl et al. | Feb. 9, 1943 |
| 2,336,887 | Piron | Dec. 14, 1943 |
| 2,461,026 | Bilyeu | Feb. 8, 1949 |
| 2,517,051 | Swenson | Aug. 1, 1950 |
| 2,550,666 | Bilyeu | May 1, 1951 |
| 2,582,088 | Walthers | Jan. 8, 1952 |
| 2,688,253 | Markson | Sept. 7, 1954 |